Aug. 2, 1960 G. F. QUAYLE 2,947,549
RUBBER SUSPENDED ARTICULATING AXLE FOR INDUSTRIAL TRUCK
Filed Aug. 26, 1957 2 Sheets-Sheet 1
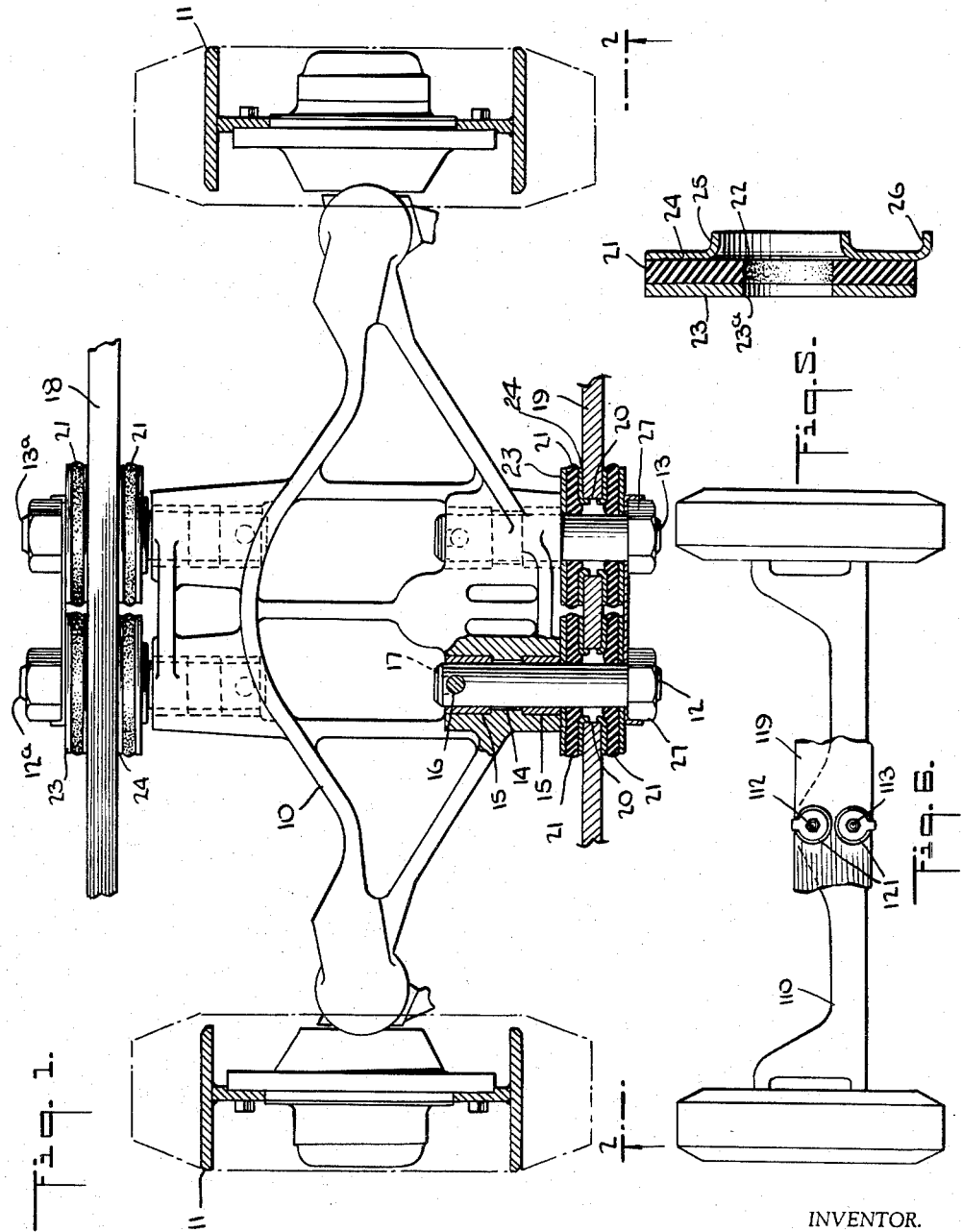
INVENTOR.
GEORGE F. QUAYLE
BY
A.H.Golden
ATTORNEY Aug. 2, 1960      G. F. QUAYLE      2,947,549
RUBBER SUSPENDED ARTICULATING AXLE FOR INDUSTRIAL TRUCK
Filed Aug. 26, 1957      2 Sheets-Sheet 2
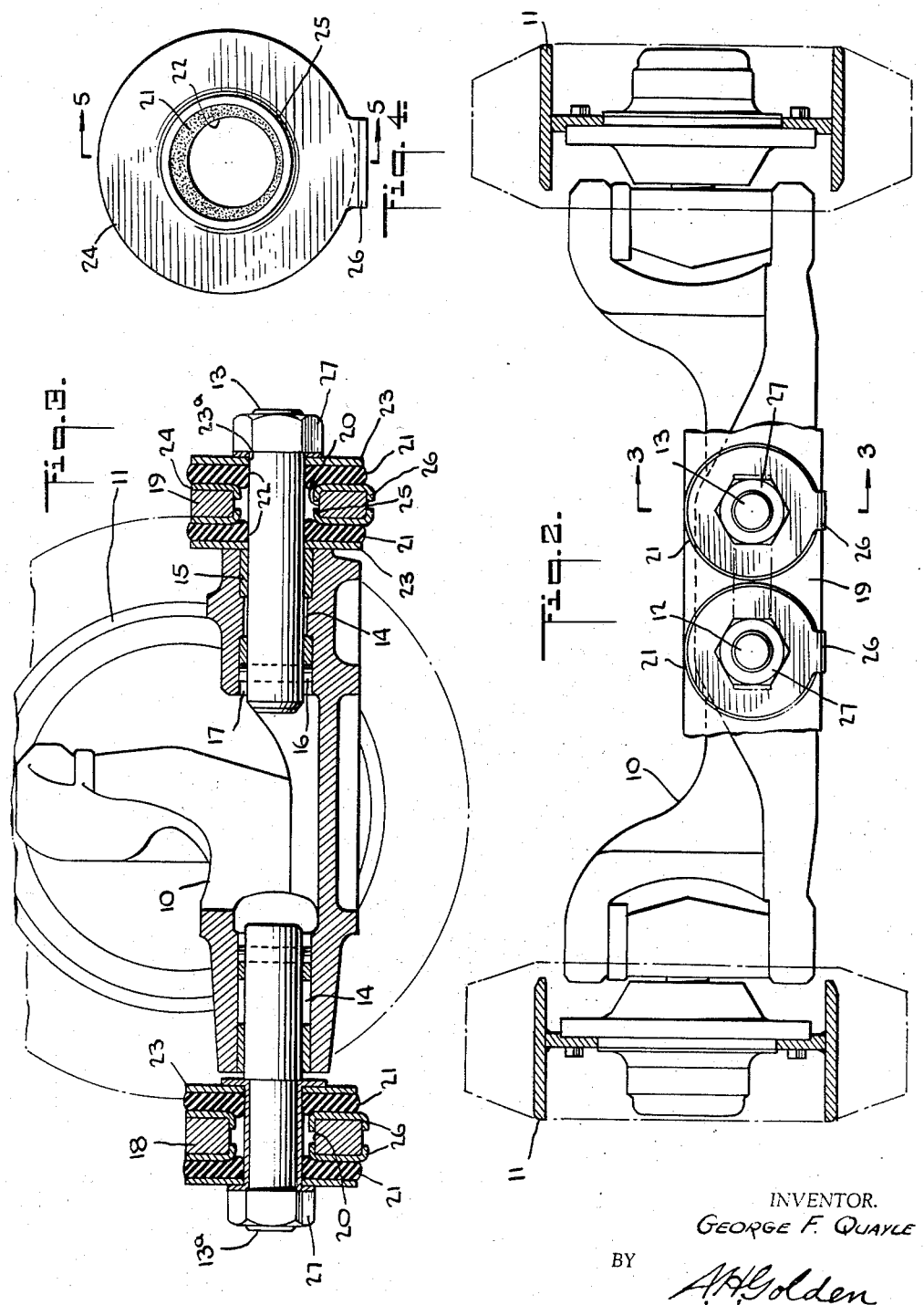
INVENTOR.
GEORGE F. QUAYLE
BY
A. H. Golden
ATTORNEY

United States Patent Office 2,947,549
Patented Aug. 2, 1960

2,947,549

RUBBER SUSPENDED ARTICULATING AXLE FOR INDUSTRIAL TRUCK

George F. Quayle, Philadelphia, Pa., assignor to The Yale & Towne Manufacturing Company, Stamford, Conn., a corporation of Connecticut Filed Aug. 26, 1957, Ser. No. 680,252

10 Claims. (Cl. 280—112)

This invention relates to an articulating axle construction for an industrial truck.

It is quite usual to equip an industrial truck with an axle that articulates. Such axles by articulating allow the truck wheels sufficient freedom of movement to conform with the terrain that the truck traverses. However, a very considerable problem is involved in utilizing an articulating axle, since the movement of the axle tends to destroy the stability of the truck. The problem is particularly difficult when it concerns an industrial truck, since such trucks often support a load in a somewhat elevated position, and the axle cannot be allowed to pivot freely since that will seriously impair the equilibrium of the truck and its load.

Much effort has been made through the use of shock absorbers and other devices, and varying types of springs, to stabilize the truck while yet allowing the axle to articulate so that the wheels can follow the surface of the ground over which they move. The patent to Schroeder, No. 2,331,734, attacks the problem through the pivoting of the axle on two parallel shafts. The axis of one shaft is the tilt axis in one direction of tilt while the axis of the other shaft is the tilt axis in the opposed direction. In this way, Schroeder obtains greater equilibrium than where one central tilt axis is used.

Nevertheless, where the axle rotates on a pivot, and this is true whether the axle has only one pivot, or two pivots as in Schroeder, the stability of the truck actually depends almost completely on the nature of the springs that are utilized to resist the rotation of the axle, or in other words, the tilting of the truck relatively to the ground. Further, there must be some limit means to prevent excessive tilting. Unfortunately, where there is excessive tilting brought about through the overcoming of the resistance of the springs, the truck is already unstable at the time the limit stop is encountered, so that the truck will go over on its side and dump its load.

I have conceived by my invention an exceedingly novel construction utilizing two bearing axes in which I pivot or articulate an axle relatively to an industrial truck, but with the pivoting opposed with an increasingly effective force whereby to prevent excessive tilting of the truck. My invention makes possible the necessary articulation of the axle and its wheels, while contributing great stability and providing, in effect, a yielding stop for tilting movements of the truck.

In essence, my invention resides in the utilization of rubber or some equivalent yielding resilient material to oppose pivoting of the axle at two spaced points, those points being at the axes of two pivot shafts about which I prefer my axle to articulate.

As a particular feature of my invention, I use rubber or an equivalent material to resist the rotation of each shaft. Preferably I use two rubber parts, and each of these is preferably applied as a sleeve about each pivot shaft. Means secure each rubber part in prodetermined relation to the axle and to the main frame of the truck. In my preferred construction, one or more rubber members encircle each pivot shaft, with each rubber member secured to the axle and the truck frame in such a way as to act in shear when the axle pivots. Each rubber member will then yield in shear to permit some rotation of the axle about one pivot shaft, while a part of the stress incidental to that rotation is accepted through yielding of the rubber member encircling the other pivot shaft. By so accepting the stress, the rubber members will offer increasingly greater resistance to the pivoting of the axle, and will act with extremely good effect as a stop to limit the tilting movements of the truck relatively to the axle.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a partly sectional plan view showing my novel articulating axle construction.

Fig. 2 is a view on the line 2—2 in Fig. 1.

Fig. 3 is a cross section taken on the line 3—3 in Fig. 2.

Fig. 4 shows an end view of a rubber assembly that I utilize in my invention.

Fig. 5 is a cross section on the line 5—5 in Fig. 4.

Fig. 6 shows a further form of my invention.

For the purpose of describing my invention, I show in Figs. 1 and 2 an axle 10, and a wheel 11 mounted to rotate relatively to each end of the axle 10. I believe it will be unnecessary to describe the details of the means through which the wheels 11 are mounted, since those details are not important and I may utilize any suitable means for that purpose. To facilitate an understanding of the novel construction whereby I mount the axle 10 for articulating movement, it will be best to refer here to Fig. 1, in which I show four pivot shafts 12, 12a 13, 13a, that are arranged in two parallel axes at right angles to the axle 10, or in other words, parallel to the longitudinal truck axis. The four shafts 12, 12a, 13, 13a will function merely as one shaft in each of the two shaft axes, as will be better appreciated as my description proceeds, and therefore I may conceivably utilize merely one shaft in each axis in place of shafts 12, 12a, 13, 13a. However, I do prefer to utilize the construction that I show in the drawings, with the shafts 12, 13 and 12a, 13a arranged on the opposed front and rear sides of axle 10.

Because each of the shafts 12, 12a, 13, 13a in my preferred construction is mounted through similar means, I shall confine my detailed description to the mounting of shaft 12, as shown in Figs. 1 and 3. Thus, the axle 10 has an opening 14 for the shaft 12, with bearing sleeves 15 on which shaft 12 is supported in that opening. Bearing sleeves 15 are integrally secured in the opening 14, as by a force fit. The inner end of shaft 12 has a bore for a cross pin 16, the end portions of that pin 16 engaging slots 17 in the inner end of one sleeve 15 when in assembled position. An end portion of shaft 12 is then in position extending from the side of axle 10, with the cross pin 16 holding the shaft 12 against rotation and also against outward movement relatively to axle 10.

Referring particularly to Fig. 1 of the drawings, the main frame of the truck has transverse portions 18, 19 that are in juxtaposed relation to the opposed front and rear sides of axle 10, with openings 20 that encircle the outward end portions of shafts 12, 13 and 12a, 13a. It should be observed that the openings 20 are considerably larger in diameter than the shafts, whereby to provide clearance that will enable the shafts to move relatively to the frame portions 18, 19.

Between the shafts 12, 13, 12a, 13a and the frame portions 18, 19, I utilize a plurality of rubber members 21, one of which is shown in detail in Figs. 4 and 5. Thus, each rubber member 21 preferably is a disc having a central opening 22, and has bonded to one end thereof a metal washer 23, the opening 23a in that washer being formed to have a locking friction fit upon shafts 12, 12a, 13, 13a. Bonded to the opposed end of each rubber disc 21 is a further washer 24, Figs. 4 and 5, that washer having around its opening a flange 25 that fits the opening 20 in truck frame members 18, 19. Each washer 24 is so arranged that its opening and flange 25 are in eccentric relation to the opening 23a in the opposed washer 23 when the rubber disc 21 is in an unstressed condition, as is well shown in Figs. 4 and 5. Each washer 24 has also a lug 26 that is in locating and locking relation to a surface on one of the frame portions 18, 19, when the flange 25 on the washer is in position in a frame opening 20, as may be seen in Figs. 2 and 3.

Referring again to Fig. 1, two of the rubber discs 21 are assembled in encircling relation to each of the shafts 12, 13, 12a, 13a, with the discs 21 on each shaft arranged at opposed sides of the corresponding transverse frame portion 18 or 19. Thus, if we refer particularly to the two rubber discs 21 encircling the shaft 12, Figs. 1 and 3, it will be seen that the washer 24 on each rubber disc 21 is positioned against the frame portion 19 with its flange 25 engaged in the corresponding frame opening 20. The locking lug 26 on each washer 24 is then in position against the lower surface of frame portion 19, Figs. 2 and 3. Thereby, the lug 26 together with flange 25 will hold washer 24 against lineal and rotating movement relatively to frame portion 19, so that each washer 24 will secure the corresponding end of its rubber member or disc 21 in predetermined relation to the truck frame. It will be remembered that the washers 23 on the other ends of the rubber discs 21 have a locking friction fit on the shafts 12, 13, 12a, 13a. Therefore, the opposed ends of each disc 21 are secured in predetermined relation to the truck frame and to axle 10. Each shaft 12, 13, 12a, 13a has a nut 27 threaded on its outer end, those nuts 27 acting together with the cross pins 16 on the opposed ends of the shafts to hold the axle 10, rubber members 21, and transverse frame portions 18, 19 in assembled relation to one another.

From the description that I have made, it will be understood that the rubber members or discs 21 resist movement between the axle 10 and transverse frame members 18, 19. Thus, the rubber discs 21 will act in shear to support the truck frame relatively to axle 10. When the weight of the frame is applied to those discs 21, they will yield somewhat so that the flanged opening 25 in each washer 24 will move toward an aligned position relatively to its corresponding shaft 12, 12a, 13, 13a, that position being clearly indicated in Fig. 3, of the drawings. The shafts 12, 12a, 13, 13a will then be in substantially aligned relation to openings 20 in frame portions 18, 19 but can move in those openings through further yielding of the rubber discs 21 in shear.

To understand fully the operation of my novel articulating axle, let us first assume that one of the wheels 11 encounters an irregularity in the surface of the ground, tending to tilt the axle 10 relatively to the truck. Naturally the axle 10 can tilt through yielding of the rubber discs 21 in shear, while the shafts 12, 12a, 13, 13a move in the openings 20 in the frame portions 18, 19. By allowing the axle 10 to tilt or articulate, my unusual construction will enable the wheels 11 to conform with the terrain that the truck traverses. During this articulating movement of the axle, the rubber discs 21 will nevertheless hold the axle 10 in the proper aligned relation to the truck frame. I shall now describe the manner in which my invention, while allowing the axle to articulate, will be effective to prevent excessive tilting of the truck, thus preserving the equilibrium of the truck.

Let us assume that the truck starts to tilt relatively to the ground through yielding of the rubber discs 21. Incidental to that tilting of the truck, the truck frame portions 18, 19 may rotate in the axis of the shafts 12, 12a, Fig. 1. During that rotation, the rubber discs 21 that encircle the particular axis, that is, of shafts 12, 12a, will yield in rotary shear. However, a part of the stress that is incidental to the rotating movement will be accepted by the rubber discs 21 that encircle the shafts 13, 13a, those discs yielding in linear shear. By so acting in linear and rotary shear, the rubber discs 21 will offer increasingly greater resistance to the tilting of the truck frame. Should the frame continue to tilt, the shearing resistance of the discs 21 will reach that point at which it will prevent further tilting so that the discs will act very effectively as a stop for the tilting movements of the frame.

Thus, by utilizing rubber shear members that encircle shafts in two parallel axes, I am able to mount an axle for articulating movement relatively to a truck, but without impairing the equilibrium of the truck. I have already called attention to the fact that I may utilize rubber members that encircle merely one shaft in each of two axes, and I do not wish to be limited to the particular construction that I have chosen to illustrate. As a matter of fact, I also contemplate mounting the shaft and rubber members in axes that are arranged one above the other, as I show in Fig. 6 of the drawings. That arrangement has parallel shafts 112, 113 and rubber discs 121 through which an axle 110 is articulated relatively to a frame portion 119, substantially as I have described while referring to Figs. 1, to 5, but with the two axes of the shafts 112, 113 in vertical relation to one another. It is important to realize merely that I utilize shafts and rubber shear members that are mounted in two parallel axes. Whether those axes are in horizontal relation as in Figs. 1 to 5, or vertical relation as in Fig. 6, my invention will enable an axle to articulate rather freely on a truck, but will be exceedingly effective to prevent excessive articulating movement whereby the stability of the truck will not be impaired.

I believe that the construction and operation of my novel articulating axle construction will now be understood, and that the very considerable advantages of my invention will be fully appreciated by those persons skilled in the art.

I now claim:

1. In a truck of the class described, a main frame, an axle having a wheel mounted to rotate on each end thereof, shafts arranged in two parallel longitudinal axes and through which said axle is mounted to rotate relatively to said main frame, rubber members arranged at the front and rear sides of said axle with each member encircling a shaft, means securing one end of each rubber member to said main frame and the opposed end of the member to said axle whereby each rubber member acts in shear to resist movement of said axle relatively to said main frame, each rubber member that encircles a shaft in one axis yielding in shear to permit some rotation of the axle about that shaft while a part of the stresses incidental to said rotation is accepted through yielding of each rubber member that encircles a shaft in the other axis, and said rubber members by so accepting the stresses offering increasingly greater resistance to the rotation of the axle whereby to act as a stop for tilting movements of the main frame.

2. In a truck of the class described, a main frame, an axle having a wheel mounted to rotate on each end thereof, a pair of shafts through which said axle is mounted to rotate in parallel longitudinal axes relatively to said main frame, a rubber member encircling each shaft, a washer bonded to each end of the rubber member, one of said washers on each member being secured to the corresponding shaft and the other washer being a movable washer having clearance relatively to said shaft, means mounting said movable washers and shafts in predetermined relation to said main frame and axle whereby the rubber members resist movement of said axle relatively to said main frame, each movable washer moving yielding of the rubber to permit some rotation of the axle about the axis of the corresponding shaft while a part of the stresses incidental to said rotation is accepted through yielding of the rubber encircling the other shaft, and said rubber members by so accepting the stresses offering increasingly greater resistance to the movement of the axle when rotating about either shaft.

3. In a truck of the class described, a main frame, an axle having a wheel mounted to rotate on each end thereof, a pair of shafts through which said axle is mounted to rotate in parallel longitudinal axes relatively to said main frame, a rubber member encircling each shaft, a washer bonded to each end of the rubber member, one of said washers on each member being secured to the corresponding shaft, the other washer being a movable washer having a relatively large opening that is in eccentric relation to the shaft when the rubber is unstressed, means mounting said movable washers and shafts in predetermined relation to said main frame and axle whereby the rubber members resist movement of said axle relatively to said main frame, each movable washer moving somewhat when the rubber yields due to the weight of the main frame whereby to move the opening in that washer toward aligned relation to its shaft, and each rubber member further yielding to permit some rotation of the axle about the axis of the corresponding shaft while a part of the stresses incidental to said rotation is accepted through yielding of the rubber encircling the other shaft.

4. In a truck of the class described, a main frame having a transverse frame portion, an axle having a wheel mounted to rotate on each end thereof, a pair of shafts arranged in openings in said axle and transverse frame portion in parallel relation to the longitudinal truck axis, one of said openings having clearance relatively to each shaft whereby the shaft by moving in that opening will allow the axle to move relatively to said transverse portion of the frame, a rubber member encircling each shaft, means securing opposed ends of each rubber member in predetermined relation to said transverse frame portion and axle whereby the rubber member acts in shear to resist movement of the axle relatively to said main frame, and each rubber member yielding in shear through movement between its opposed ends so that the axle can rotate about the corresponding shaft while a part of the stresses incidental to said rotation is accepted through yielding of the rubber member on the other shaft.

5. In a truck of the class described, a main frame an axle having a wheel mounted to rotate on each end thereof, transverse portions on said main frame juxtaposed to the front and rear sides of said axle, longitudinal shafts arranged in parallel openings in the front and rear sides of said axle and in each of said transverse frame portions, one of said openings having clearance relatively to each shaft whereby the shafts by moving in those openings will allow the axle to move relatively to said frame transverse portions, a rubber member encircling each shaft in juxtaposed relation to each frame transverse portion, means securing opposed ends of each rubber member in predetermined relation to the juxtaposed frame portion and axle whereby the rubber members act in shear to resist movement of the axle relatively to said main frame, each rubber member yielding in shear through movement between its opposed ends so that the axle can rotate about the corresponding shaft axis while a part of the stresses incidental to said rotation is accepted through yielding of the rubber member on the other shaft, and said rubber members by their relation to said transverse frame portions holding the axle in aligned relation to the truck frame when the axle rotates.

6. In a truck of the class described, a main frame having a transverse frame portion, an axle having a wheel mounted to rotate on each end thereof, a pair of shafts mounted on said axle in positions parallel to the longitudinal truck axis, a portion of each shaft arranged in an opening in said transverse frame portion and having clearance relatively to that opening whereby to allow the axle to move relatively to said transverse portion of the frame, a circular rubber member assembled on each shaft, a washer bonded to each end of said rubber member, one of said washers being integrally secured on the corresponding shaft, the other of said washers being a movable washer having clearance relatively to the shaft, means securing each movable washer relatively to said transverse portion of the frame whereby the rubber members resist movement of the axle relatively to said frame portion, and each rubber member yielding to permit some movement between the washers that are bonded to that member so that the axle can rotate about the axis of the corresponding shaft while a part of the stresses incidental to said rotation is accepted through yielding of the rubber member on the other shaft.

7. In a truck of the class described, a main frame having a transverse frame portion, an axle having a wheel mounted to rotate on each end thereof, a pair of shafts arranged in openings in said axle and transverse frame portion in parallel relation to the longitudinal truck axis, one of said openings having clearance relatively to each shaft whereby the shafts by moving in those openings will allow the axle to move relatively to said transverse portion of the frame, a circular rubber member to each shaft, a washer bonded to each end of the rubber member, means whereby one of said washers when in assembled position is integrally secured to the corresponding shaft, the other of said washers on each rubber member having clearance relatively to the shaft, means whereby said other washer when assembled interlocks relatively to said transverse frame portion, and means on opposed ends of each shaft holding said axle, transverse frame portion, and rubber members including said washers in assembled relation to one another, whereby said rubber members resist movement of the axle relatively to the main frame of the truck while adapted to yield in shear to allow the axle to rotate somewhat relatively to the truck.

8. In a truck of the class described, a main frame, an axle, a pair of axle mounting rubber members, means fixing said members to the frame with one in each of two axes extending longitudinally of the truck and juxtaposed to one another at the center of the truck, each axle mounting member constructed to yield with rotating movement about its corresponding axis and also with linear movement transverse to that axis, means fixing a portion of each axle mounting rubber member to a part of the axle at the longitudinal center of said axle whereby to support said axle in position relatively to the frame, said rubber members together effective by their rotating and linear yielding while juxtaposed to one another to allow said axle to rotate about the center of the truck, while offering such increasing resistance as to limit the rotating movements of the axle.

9. In a truck of the class described, a main frame, an axle, a pair of axle mounting rubber members positioned one in each of two axes extending longitudinally of the truck and juxtaposed to one another at the center of the truck, each axle mounting member formed in its axis with opposed ends adapted through yielding of the rubber in shear to rotate and also to move linearly relatively to one another, means fixing one end of each axle mounting rubber member to the frame and the other end of each member to a part of the axle at the longitudinal center of said axle whereby to support said axle in position relatively to the frame, said rubber members effective by their juxtaposed position and by yielding together in shear to allow said axle to rotate about the center of the truck, while offering such increasing resistance as to limit the rotating movements of the axle.

10. In a truck of the class described, a main frame, an axle, a pair of axle mounting yielding members positioned one in each of two axes extending longitudinally of the truck and juxtaposed to one another at the center of the truck, each axle mounting member constructed with a rubber portion and metal end portions positioned in the axis of the member and bonded to opposed ends of said rubber portion, said end portions of each member adapted through yielding of the rubber in vertical shear to rotate and also to move linearly relatively to one another, means fixing one metal end portion of each axle mounting member to the frame and the other metal end portion to a part of the axle at the longitudinal center of said axle whereby to support said axle in position relatively to the frame, said yielding members together effective by their juxtaposed position and by yielding of the rubber in rotating and linear shear to allow said axle to rotate about the center of the truck, while offering such increasing resistance as to limit the rotating movements of the axle.

References Cited in the file of this patent

UNITED STATES PATENTS

| | | |
|---|---|---|
| 2,141,165 | Armington | Dec. 27, 1938 |
| 2,331,734 | Schroeder | Oct. 12, 1943 |
| 2,689,136 | Hendrickson | Sept. 14, 1954 |
| 2,715,022 | Krotz | Aug. 9, 1955 |